United States Patent [19]

Schneider

[11] Patent Number: 4,553,653
[45] Date of Patent: Nov. 19, 1985

[54] RAPID-STOP TORQUE-TRANSMITTING DEVICE

[75] Inventor: Rudolf Schneider, Meckenbeuren, Fed. Rep. of Germany

[73] Assignee: Zahnradfabrik Friedrichshafen Aktiengesellschaft, Friedrichshaften, Fed. Rep. of Germany

[21] Appl. No.: 372,340

[22] Filed: Apr. 27, 1982

[30] Foreign Application Priority Data

Apr. 29, 1981 [DE] Fed. Rep. of Germany ....... 3116902

[51] Int. Cl.[4] ............................................. B60K 41/24
[52] U.S. Cl. ............................. 192/18 B; 192/84 C; 192/70.28
[58] Field of Search ................. 192/12 D, 18 B, 84 B, 192/106.1, 107 C, 109 D, 70.19, 70.28, 70.17, 70.16, 84 BA, 84 C, 84 AA, 48.2, 48.91; 310/76

[56] References Cited

U.S. PATENT DOCUMENTS

| 2,982,385 | 5/1961 | Gamundi | 192/84 B |
|---|---|---|---|
| 3,162,285 | 5/1959 | Sala | 192/84 |
| 3,624,767 | 11/1971 | Kroeger | 192/18 B |
| 3,675,747 | 7/1972 | Obermark | 192/48.2 |
| 3,972,636 | 8/1976 | Peter et al. | 403/370 |
| 4,222,471 | 9/1980 | Hsu | 192/18 B |
| 4,296,851 | 10/1981 | Pierce | 192/106.1 |

FOREIGN PATENT DOCUMENTS

1294751 5/1969 Fed. Rep. of Germany .
2610720 9/1977 Fed. Rep. of Germany .
2097274 2/1972 France .

OTHER PUBLICATIONS

PICANOL Drawing, No. B 90940.
Schleifringlose Arbeitsstrom- und Dauermagnet-Einflachenkupplungen und -bramsen Bauart ZF-Siemens-pp. 8/1-8/3.
Stromag Elektromagnet-Kupplungen-und-Bremsen-Nov. 7, 1956.
Stromag-KA 241 30 0401.

Primary Examiner—George H. Krizmanich
Attorney, Agent, or Firm—Karl F. Ross; Herbert Dubno

[57] ABSTRACT

A rapid-torque clutch/brake assembly has a hub secured to the driven shaft and connected to an axially displaceable ring by a pair of spring rings which flank interdigitating arms of the axially displaceable ring and the hub. An electromagnetic coil can be energized to selectively shift the axially displaceable ring into engagement with a clutch ring coupling the shaft to a driving element such as a pulley, or into engagement with a brake ring connected to a housing for braking rotation of the shaft.

3 Claims, 2 Drawing Figures

RAPID-STOP TORQUE-TRANSMITTING DEVICE

FIELD OF THE INVENTION

My present invention relates to a rapid-stop torque-transmitting device and, more particularly, to a torque-transmitting device for selectively coupling a driving element with a load and, as may be necessary, for the rapid braking of that load, e.g. in an emergency or for some other purpose.

BACKGROUND OF THE INVENTION

Torque-transmitting devices, e.g. magnetic clutches, have been provided heretofore for the selective coupling of a driving element, e.g. a pulley, with a load which can be represented in the form of a shaft upon which the pulley is rotatable.

In many cases it is desirable that the shaft or load be brought immediately to standstill when the driving element is cut off or the clutch is disengaged. For example, in saws or other cutting appliances, presses and the like, practically instantaneous braking of the load is desirable after disengaging of the clutch for the safety of the operator and protection of the equipment.

The rapid or instantaneous braking of the load can be effected magnetically as well.

It is known, in this connection, to provide an armature disk which can be connected to the load, i.e. the shaft, and to additionally provide outwardly of this armature disk, a ring which can be formed with clutch and braking surfaces, means for axially displacing this ring, and a resilient connection between this ring and the armature disk.

The armature disk may be provided with or considered to be an entrainer which can be resiliently or fixedly mounted upon the shaft.

In general, therefore, the invention can be considered to deal with a torque-transmitting unit capable of providing rapid braking, as required, which comprises such an armature disk and entrainer arrangement.

The present assignee (Zahnradfabrik Friedrichshafen Aktiengesellschaft of Friedrichshafen, German Federal Republic) markets a single-face clutch and brake with the designation EK/EB-ER in which a first electromagnet around the single armature disk can be energized to actuate the clutch while a further magnet is energizable to actuate the brake.

The armature disk is angularly fixed to the shaft but can be axially shiftable thereon via a spline arrangement.

This spline arrangement has been found to be disadvantageous because it introduces a location at which mechanical wear can be pronounced. Furthermore, a wobbling movement may be generated in the system.

Another combination of electromagnetic clutch and brake, marketed by the German firm STROMAG (MFE 32) utilizes a relatively thick spring ring in a small diameter region between two rotatable parts, one of which is an armature disk fixed angularly and axially to the shaft, and the other of which is an annular part entrained by a spring angularly upon the armature disk but capable of limited axial movement relative to the latter. Of course, the relative axial mobility of the two parts is highly limited by the relatively thick spring and the rate of reaction of the unit is similarly limited, i.e. a rapid braking action cannot be guaranteed.

OBJECTS OF THE INVENTION

It is the principal object of the present invention to provide an electromagnetic clutch and brake unit for the surfaces described whereby the disadvantages of the earlier systems described can be obviated.

Still another object of this invention is to provide a device for transmission of torque between a driving element and a driven element which permits rapid braking of the driven element with especially low braking force thresholds and high response times.

Still a further object of my invention is to provide a simple, low cost, low maintenance unit which can be energized with a simple electrical circuit and has a rapid response time, but which is capable of braking large loads and of transmitting high torques.

SUMMARY OF THE INVENTION

These objects and others which will become apparent hereinafter are attained, by a system of the type described, but which comprises an armature disk angularly and axially fixed to the shaft, a clutch and brake ring disposed outwardly of this disk and axially shiftable relative thereto while being angularly connected to this disk by entrainers on the rings and on the disk. The entrainers can include radial arms projecting from the ring toward the disk and from the disk toward the ring, the entrainers of the ring and the disk alternating with one another.

The resilient connection between the ring and the disk is effected by two spring rings flanking these entrainers and secured thereto. The connection of the spring rings to the entrainers can be effected by ribbons and the spring rings can be comparatively thin spring metal leaves.

According to a feature of the invention, the disk is provided with a conical collar of comparatively small wall thickness which can be compressed against the shaft forming the driven element by a compression sleeve or plate having a frustoconical bore and axially drawn toward the disk by angularly equispaced bolts bridging the compression sleeve and the disk.

The two annular springs or spring rings can have the same inner and outer diameters and thicknesses, and the means for axially displacing the brake and clutch ring can be electromagnets. This ring can pass through an air gap between one set of electromagnets while serving as the clutch and through an air gap between another set of electromagnets while serving as the brake.

The system of the invention has the advantage that comparatively thin rings flanking the entrainers can be used to provide high torque transmission and yet rapid axial displacement of the outer ring which is especially important for rapid braking.

Because the elastic element is in the form of two distinct spring rings, undesired eddy currents and stray magnetic flux is minimized in the region of the electromagnets and thus cannot interfere with a rapid switchover from clutch energization to brake energization. Mechanical wear is minimized, the system has high operating reliability and is characterized by a low response threshold. High torques can be transferred without residual moments. The unit can be simply mounted and maintained and has been found to be especially effective for weaving looms and like yarn-handling machinery, for tools, for packing and printing machines and even for hand operated appliances.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
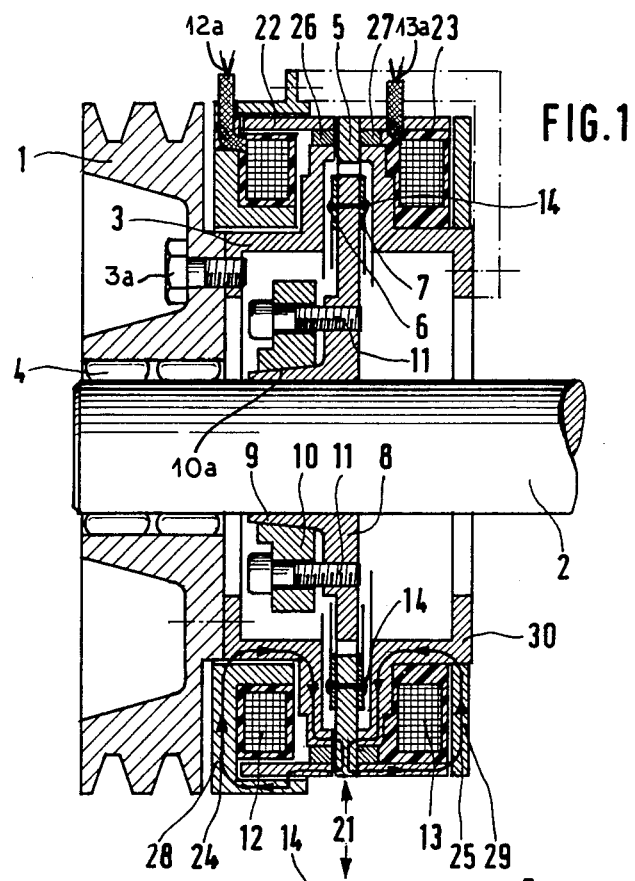
FIG. 1 is an axial cross sectional view illustrating the device in accordance with the invention.
Figure 2:
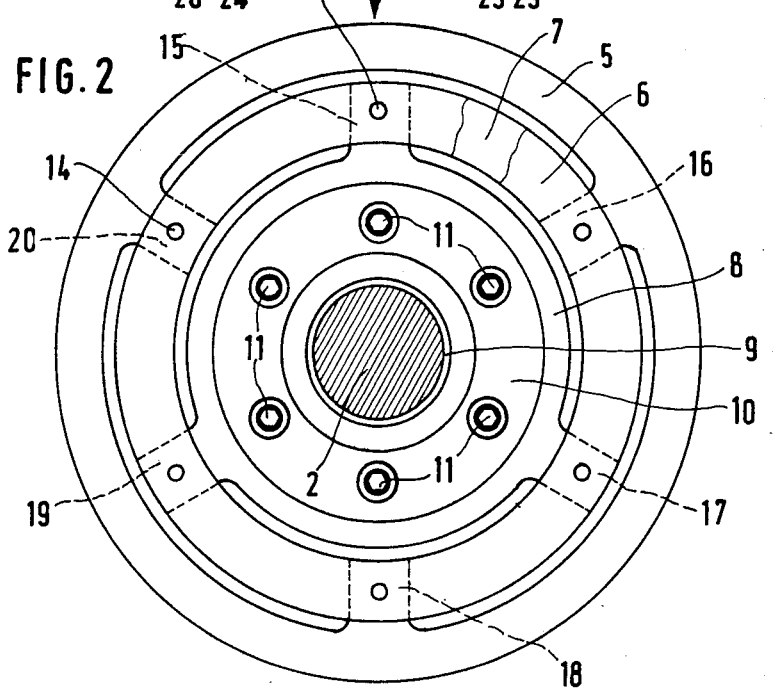
FIG. 2 is an end view showing the braking and clutch ring, the spring mounting thereof and the armature disk support for this ring, according to the invention, the shaft being shown in section.

In the unit of FIGS. 1 and 2, a torque is transmitted from a V-belt pulley 1 to a shaft 2, which can be connected to one of the loads previously described. The load is generally of a type which should be readily braked when the driving connection is cut off.

The pulley 1 is angularly and axially fixed to a clutch ring 3, e.g. by bolts 3a, and rides upon the shaft 2 via a bearing 4.

The pulley 1 need not, of course, be directly mounted upon the driven shaft and can be rotatable upon some other shaft or housing portion.

An armature disk 21 is axially and angularly fixed to the shaft 2. To this end, the armature disk 21 comprises a hub portion 8 with a thin-wall frustoconical collar 9 forming a compression clamp which is pressed against the shaft 2 by a compression cone formed by a sleeve 10 having a frustoconical bore 10a and drawn axially toward the hub 8 by angularly equispaced screws 11.

The hub 8 is juxtaposed on one side with the clutch ring 3 and on its opposite side with a brake ring 30 affixed to a housing (not shown) with respect to which the shaft 2 is rotatable.

The armature disk 21 consists of the hub 8 formed with the compression fitting 9, 10 and 11 whereby the hub is affixed to the shaft and an outwardly disposed brake and clutch ring 5 which is coplanar with the hub and has a friction sleeve juxtaposed with each of the clutch ring 3 and brake ring 30. The connection between the ring 5 of disk 21 and the hub 8 is effected by a pair of identical spring rings 6 and 7, which are thin, composed of spring steel, and are riveted to radial arms 15, 17 and 19 of the hub 8, which are disposed between and angularly spaced from the inwardly extending radial arms 16, 18 and 20 of ring 5. The arms 15-20 thus alternate around the disk 21 between the ring 5 and the hub 8.

In the space between the ring 5 and the hub 8, into which these arms extend in opposite directions radially, the spring 6 and 7 interconnects the arms by being riveted at 14 to each other by rivets which pass through the arms.

Because the arms of the ring and hub are spaced apart significantly and are spanned by relatively long circuit lengths of string, axial movement of the ring relative to the hub is facilitated. However, because two such rings flank the interdigitated arm, angular torque transmission in the plane of the spring ring 6 and 7 is highly effective.

When the clutch is to be energized, an electric current is passed via the leads 12a through the annular coil 12, which generates a magnetic flux 24, which passes through the clutch ring 3, the ring 5 of the armature disk 21, a magnetically conductive ring 22 surrounding the coil and clutch ring, and a return-path ring 28 to close the flux path.

Across the nonmagnetic insert 26, the flux jumps to and from the ring 5 between annular poles (i.e. across a pole pan) formed by the clutch ring 3 and the ring 22 across the air gap. The ring 5 is thus attracted to ring 3 and frequently engages the latter to rotatably entrain the pulley 1 with the shaft 2.

For braking, the coil 12 is de-energized and coil 13 is energized via the leads.

The magnetic flux path 25 thus extends through the fixed brake ring 30 and jumps across the nonmagnetic insert 27 and the air gap to the ring 5 of disk 21, returning through the magnetical conductive ring 23 and the return-path ring 29. The brake ring 30 and the conductive ring 23 thus form annular pole pairs which are bridged by the ring 5 so that the latter is attracted against the brake ring 30 and frequently engages the latter so that the shaft is rapidly brought to standstill.

I claim:

1. A torque-transmitting device for transmitting a torque from a driving element to a driven element rotatable about an axis and for the rapid braking of said driven element, said device comprising:
    an armature disk having
        an annular inner portion fixed to said driven element,
        an annular outer portion surrounding said inner portion and mounted to shift axially relative to said inner portion, said inner portion having outwardly extending radial arms interdigitating with but spaced from inwardly extending radial arms of said outer portion, said arms being coplanar, and
        a pair of thin circularly continuous spring rings composed of spring metal flanking said arms and interconnecting same whereby said outer portion can shift axially relative to said inner portion, said spring rings having identical inner and outer diameters and being connected to said arms along a circle centered on said axis;
    a first annular member forming a pair of annular magnetic poles connected to said driving element and juxtaposed with said outer portion on one side thereof;
    a fixed second annular member having a pair of annular poles juxtaposed with said outer portion on an opposite side thereof; and
    selectively operable electromagnetic coils respectively associated with said members for energizing the respective pairs of poles to displace said outer portion into selective engagement with said first member to angularly couple said elements for torque transmission, and into engagement with said second member to brake said driven element.

2. The device defined in claim 1 wherein said driven element is a cylindrical shaft and said inner portion is a unitary hub surrounding said shaft, said hub having a thin-wall externally frustoconical, internally cylindrical collar surrounding said shaft, and an internally frustoconical compression body on said collar, means being provided for drawing said body toward said hub to compress said collar against said shaft and lock said hub on said shaft.

3. The device defined in claim 1 or claim 2 wherein said spring rings are riveted to one another through said arms along said circle.

* * * * *